United States Patent
Hu et al.

(10) Patent No.: US 8,969,760 B2
(45) Date of Patent: Mar. 3, 2015

(54) SYSTEM AND METHOD FOR MANUFACTURING AN AIRFOIL

(75) Inventors: Zhaoli Hu, Greer, SC (US); Douglas Anthony Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 424 days.

(21) Appl. No.: 13/617,145

(22) Filed: Sep. 14, 2012

(65) Prior Publication Data
US 2014/0076857 A1 Mar. 20, 2014

(51) Int. Cl.
*B23K 26/38* (2014.01)
*B23K 26/14* (2014.01)

(52) U.S. Cl.
CPC ......... *B23K 26/388* (2013.01); *B23K 2201/001* (2013.01); *B23K 26/1417* (2013.01)
USPC ............... 219/121.7; 219/121.71; 219/121.84

(58) Field of Classification Search
CPC ............. B23K 26/1417; B23K 26/388; B23K 2201/001
USPC .............................. 219/121.7, 121.71, 121.84
See application file for complete search history.

(56) References Cited

U.S. PATENT DOCUMENTS

| | | | |
|---|---|---|---|
| 4,027,137 A | 5/1977 | Liedtke | |
| 4,873,414 A | 10/1989 | Ma et al. | |
| 4,905,310 A | 2/1990 | Ulrich | |
| 4,931,615 A | 6/1990 | Muncy et al. | |
| 4,940,880 A | 7/1990 | Klingel et al. | |
| 4,952,771 A | 8/1990 | Wrobel | |
| 5,182,434 A | 1/1993 | Nakata | |
| 5,222,617 A | 6/1993 | Gregory et al. | |
| 5,345,057 A * | 9/1994 | Muller | 219/121.71 |
| 5,367,144 A | 11/1994 | Matsumura et al. | |
| 5,374,803 A | 12/1994 | Yamada | |
| 5,773,791 A | 6/1998 | Kuykendal | |
| 5,902,499 A | 5/1999 | Richerzhagen | |
| 6,001,219 A | 12/1999 | Caspar | |
| 6,140,604 A | 10/2000 | Somers et al. | |
| 6,365,871 B1 * | 4/2002 | Knowles et al. | 219/121.7 |
| 6,696,666 B2 | 2/2004 | Merdan et al. | |

(Continued)

FOREIGN PATENT DOCUMENTS

| | | |
|---|---|---|
| EP | 0937533 | 8/1999 |
| GB | 2113592 | 8/1983 |

(Continued)

OTHER PUBLICATIONS

Sensors-2012, ISSN 1424-8220; On Line Estimation of Laser-Drilled Hole Depth Using A Machine Vision Method, Chao-Ching Ho et al., Published Jul. 27, 2012, pp. 10148-10162.

*Primary Examiner* — Geoffrey S Evans
(74) *Attorney, Agent, or Firm* — Dority & Manning, PA

(57) ABSTRACT

A system for manufacturing an airfoil includes a laser beam and a first fluid column surrounding the laser beam to create a confined laser beam directed at the airfoil. A gas flowing inside the airfoil disrupts the first fluid column inside the airfoil. A method for manufacturing an airfoil includes confining a laser beam inside a first fluid column to create a confined laser beam and directing the confined laser beam at a surface of the airfoil. The method further includes creating a hole through the surface of the airfoil with the confined laser beam, flowing a gas inside the airfoil, and disrupting the first fluid column with the gas flowing inside the airfoil.

20 Claims, 5 Drawing Sheets

(56) References Cited

U.S. PATENT DOCUMENTS

| | | |
|---|---|---|
| 7,163,875 B2 | 1/2007 | Richerzhagen |
| 7,321,104 B2 * | 1/2008 | Wessner .................. 219/121.84 |
| 7,728,258 B2 | 6/2010 | Richerzhagen et al. |
| 8,581,141 B2 | 11/2013 | Muratsubaki et al. |
| 2004/0224179 A1 | 11/2004 | Sokol et al. |
| 2006/0096964 A1 | 5/2006 | Fordahl |
| 2007/0193990 A1 | 8/2007 | Richerzhagen et al. |
| 2007/0278195 A1 | 12/2007 | Richerzhagen et al. |
| 2009/0001061 A1 | 1/2009 | Beck |
| 2009/0314753 A1 | 12/2009 | Kosmowski |
| 2010/0147812 A1 | 6/2010 | Beck et al. |
| 2010/0147814 A1 | 6/2010 | Watanabe |
| 2011/0049113 A1 | 3/2011 | Glaesemann et al. |
| 2011/0076405 A1 | 3/2011 | Raji et al. |
| 2011/0163078 A1 * | 7/2011 | Fukushima et al. ..... 219/121.71 |
| 2011/0240615 A1 | 10/2011 | Suruceanu et al. |
| 2012/0074105 A1 | 3/2012 | Okamoto et al. |
| 2013/0020292 A1 | 1/2013 | Elfizy et al. |
| 2013/0146570 A1 | 6/2013 | Forsman et al. |
| 2013/0206739 A1 | 8/2013 | Reed et al. |
| 2014/0075755 A1 | 3/2014 | Hu et al. |
| 2014/0076868 A1 | 3/2014 | Hu et al. |

FOREIGN PATENT DOCUMENTS

| | | |
|---|---|---|
| JP | 2007-245230 A * | 9/2007 |
| WO | WO-89/03274 A1 * | 4/1989 |
| WO | 99/56907 | 11/1999 |
| WO | WO-00/69594 A1 * | 11/2000 |

* cited by examiner

SYSTEM AND METHOD FOR MANUFACTURING AN AIRFOIL

FIELD OF THE INVENTION

The present invention generally involves a system and method for manufacturing an airfoil.

BACKGROUND OF THE INVENTION

Turbines are widely used in industrial and commercial operations. A typical commercial steam or gas turbine used to generate electrical power includes alternating stages of stationary and rotating airfoils. For example, stationary vanes may be attached to a stationary component such as a casing that surrounds the turbine, and rotating blades may be attached to a rotor located along an axial centerline of the turbine. A compressed working fluid, such as but not limited to steam, combustion gases, or air, flows through the turbine, and the stationary vanes accelerate and direct the compressed working fluid onto the subsequent stage of rotating blades to impart motion to the rotating blades, thus turning the rotor and performing work.

The efficiency of the turbine generally increases with increased temperatures of the compressed working fluid. However, excessive temperatures within the turbine may reduce the longevity of the airfoils in the turbine and thus increase repairs, maintenance, and outages associated with the turbine. As a result, various designs and methods have been developed to provide cooling to the airfoils. For example, a cooling media may be supplied to a cavity inside the airfoil to convectively and/or conductively remove heat from the airfoil. In particular embodiments, the cooling media may flow out of the cavity through cooling passages in the airfoil to provide film cooling over the outer surface of the airfoil.

As temperatures and/or performance standards continue to increase, the materials used for the airfoil become increasingly thin, making reliable manufacture of the airfoil increasingly difficult. Specifically, the airfoil is typically cast from a high alloy metal, and a thermal barrier coating may be applied to the outer surface of the airfoil to enhance thermal protection. The cooling passages are often drilled or machined into the high alloy metal at precise locations and in precise geometries after casting to optimize the cooling media flow over the airfoil. For example, a water jet may be used to drill the cooling passages through the high alloy metal at particular locations and angles to enhance the cooling media flow over the outer surface of the airfoil. Although effective at accurately drilling small diameter holes through the high metal alloy, the water jet may also damage the thermal barrier coating and/or introduce grit byproducts inside the airfoil that may be difficult to completely remove. Alternately or in addition, the water jet may inadvertently strike the interior of the airfoil on the opposite side of the cavity causing damage inside the airfoil. The grit byproducts inside the airfoil and/or damage to the interior of the airfoil may be difficult to detect during the finishing steps of the airfoil. As a result, a system and method for manufacturing an airfoil that reduces or prevents the damage to the thermal barrier coating, introduction of grit byproducts into the airfoil, and/or inadvertent damages to the interior of the airfoil would be useful.

BRIEF DESCRIPTION OF THE INVENTION

Aspects and advantages of the invention are set forth below in the following description, or may be obvious from the description, or may be learned through practice of the invention.

One embodiment of the present invention is a system for manufacturing an airfoil. The system includes a fluid column and a laser beam inside the fluid column to create a confined laser beam directed at the airfoil. A gas flowing inside the airfoil gas disrupts the fluid column inside the airfoil.

Another embodiment of the present invention is a method for manufacturing an airfoil that includes confining a laser beam inside a fluid column to create a confined laser beam, directing the confined laser beam at a surface of the airfoil, and creating a hole through the surface of the airfoil with the confined laser beam. The method further includes flowing a gas inside the airfoil and disrupting the fluid column with the gas flowing inside the airfoil.

In yet another embodiment of the present invention, a method for manufacturing an airfoil includes directing a laser beam at a surface of the airfoil and confining the laser beam inside a fluid column outside of the airfoil to create a confined laser beam outside of the airfoil. The method further includes creating a hole through the surface of the airfoil with the confined laser beam and disrupting the fluid column with a gas inside the airfoil.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
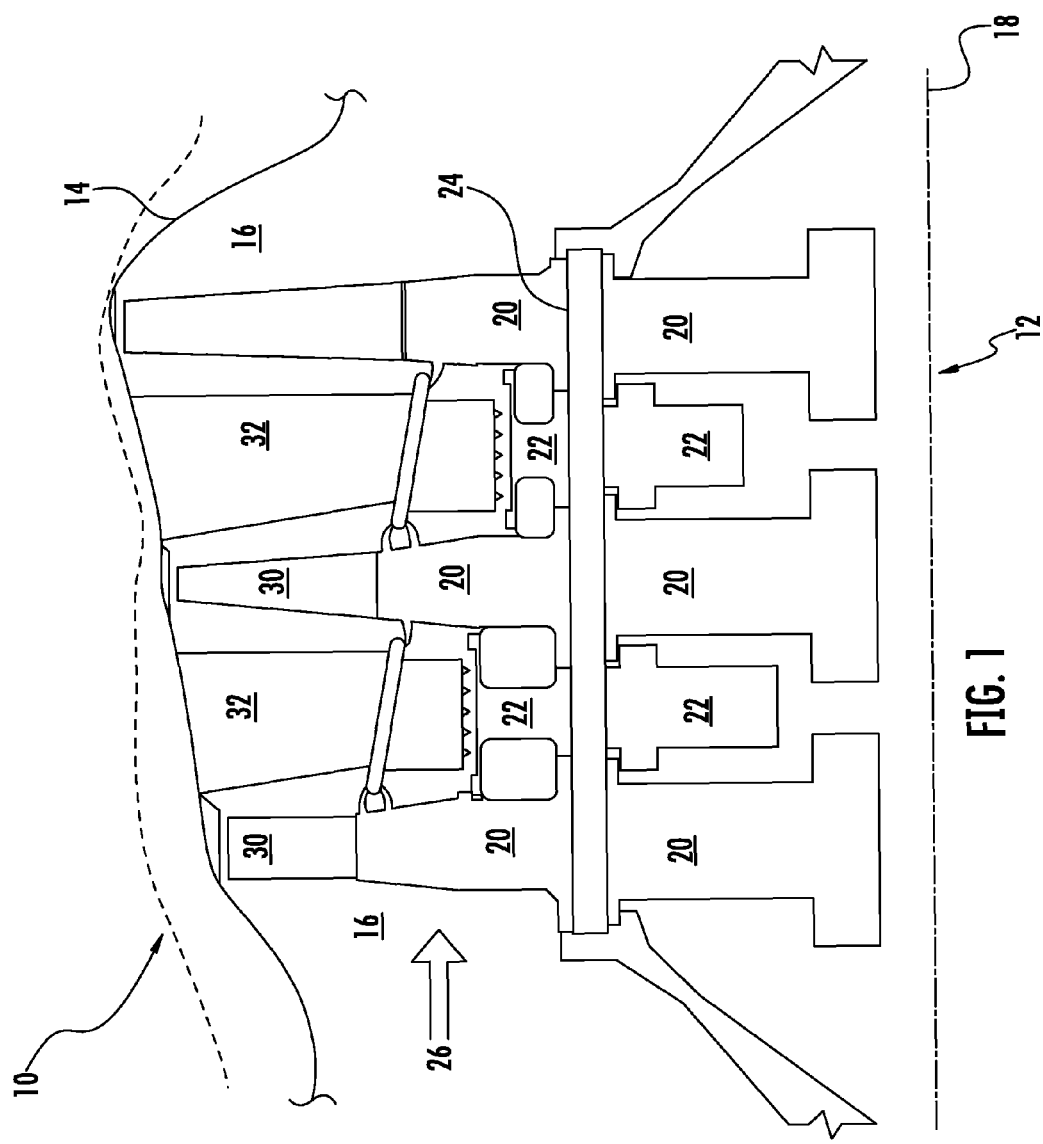
FIG. 1 is a simplified cross-section view of an exemplary turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for manufacturing an airfoil. The system generally includes an unfocused laser beam confined by a fluid column, and the confined laser beam may be used to create precise holes at particular angles through an airfoil surface. As the confined laser beam penetrates the airfoil surface, a gas flowing inside the airfoil disrupts the fluid column inside the airfoil to prevent the confined laser beam from damaging the inside of the airfoil. As used herein, the term "gas" includes any gaseous media other than air. Although exemplary embodiments of the present invention will be described generally in the context of an airfoil incorporated into a turbine, one of ordinary skill in the art will readily appreciate from the teachings herein that embodiments of the present invention are not limited to a turbine unless specifically recited in the claims.

Referring now to the drawings, wherein identical numerals indicate the same elements throughout the figures, FIG. 1 provides a simplified side cross-section view of an exemplary turbine 10 according to various embodiments of the present invention. As shown in FIG. 1, the turbine 10 generally includes a rotor 12 and a casing 14 that at least partially define a gas path 16 through the turbine 10. The rotor 12 is generally aligned with an axial centerline 18 of the turbine 10 and may be connected to a generator, a compressor, or another machine to produce work. The rotor 12 may include alternating sections of rotor wheels 20 and rotor spacers 22 connected together by a bolt 24 to rotate in unison. The casing 14 circumferentially surrounds at least a portion of the rotor 12 to contain a compressed working fluid 26 flowing through the gas path 16. The compressed working fluid 26 may include, for example, combustion gases, compressed air, saturated steam, unsaturated steam, or a combination thereof.

As shown in FIG. 1, the turbine 10 further includes alternating stages of rotating blades 30 and stationary vanes 32 that extend radially between the rotor 12 and the casing 14. The rotating blades 30 are circumferentially arranged around the rotor 12 and may be connected to the rotor wheels 20 using various means. In contrast, the stationary vanes 32 may be peripherally arranged around the inside of the casing 14 opposite from the rotor spacers 22. The rotating blades 30 and stationary vanes 32 generally have an airfoil shape, with a concave pressure side, a convex suction side, and leading and trailing edges, as is known in the art. The compressed working fluid 26 flows along the gas path 16 through the turbine 10 from left to right as shown in FIG. 1. As the compressed working fluid 26 passes over the first stage of rotating blades 30, the compressed working fluid expands, causing the rotating blades 30, rotor wheels 20, rotor spacers 22, bolt 24, and rotor 12 to rotate. The compressed working fluid 26 then flows across the next stage of stationary vanes 32 which accelerate and redirect the compressed working fluid 26 to the next stage of rotating blades 30, and the process repeats for the following stages. In the exemplary embodiment shown in FIG. 1, the turbine 10 has two stages of stationary vanes 32 between three stages of rotating blades 30; however, one of ordinary skill in the art will readily appreciate that the number of stages of rotating blades 30 and stationary vanes 32 is not a limitation of the present invention unless specifically recited in the claims.

Figure 2:
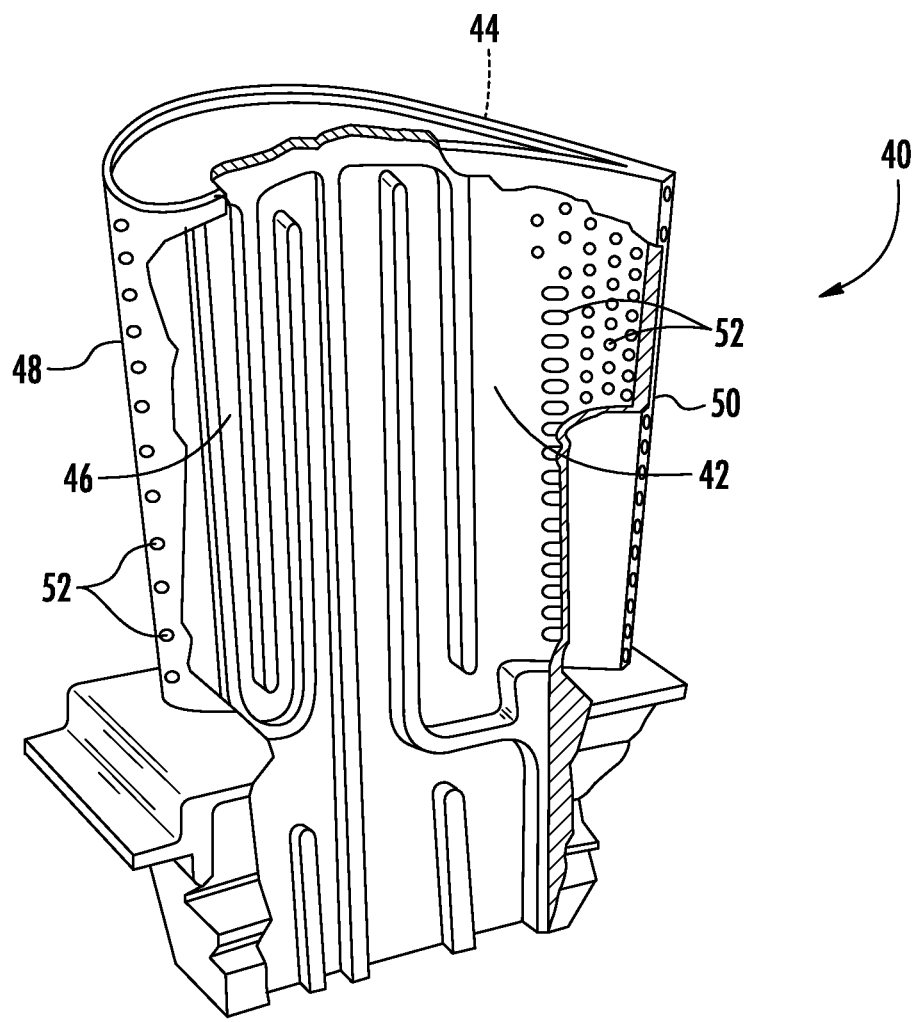
FIG. 2 is a perspective view of an exemplary airfoil according to an embodiment of the present invention.

FIG. 2 provides a perspective view of an exemplary airfoil 40, such as may be incorporated into the rotating blades 30 or stationary vanes 32, according to an embodiment of the present invention. As shown in FIG. 2, the airfoil 40 generally includes a pressure side 42 having a concave curvature and a suction side 44 having a convex curvature and opposed to the pressure side 42. The pressure and suction sides 42, 44 are separated from one another to define a cavity 46 inside the airfoil 40 between the pressure and suction sides 42, 44. The cavity 46 may provide a serpentine or tortuous path for a cooling media to flow inside the airfoil 40 to conductively and/or convectively remove heat from the airfoil 40. In addition, the pressure and suction sides 42, 44 further join to form a leading edge 48 at an upstream portion of the airfoil 40 and a trailing edge 50 downstream from the cavity 46 at a downstream portion of the airfoil 40. A plurality of cooling passages 52 in the pressure side 42, suction side 44, leading edge 48, and/or trailing edge 50 may provide fluid communication from the cavity 46 through the airfoil 40 to supply the cooling media over the outer surface of the airfoil 40. As shown in FIG. 2, for example, the cooling passages 52 may be located at the leading and trailing edges 48, 50 and/or along either or both of the pressure and suction sides 42, 44. One of ordinary skill in the art will readily appreciate from the teachings herein that the number and/or location of the cooling passages 52 may vary according to particular embodiments, and the present invention is not limited to any particular number or location of cooling passages 52 unless specifically recited in the claims.

Figure 3:
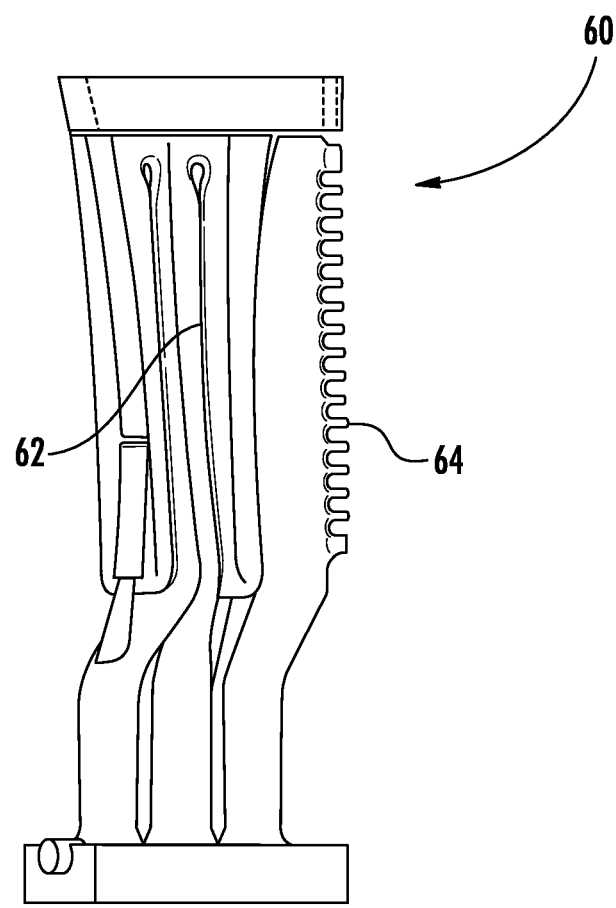
FIG. 3 is a plan view of a core that may be used to cast the airfoil shown in FIG. 2.

The exemplary airfoil 40 shown in FIG. 2 may be manufactured using any process known in the art. For example, FIG. 3 provides a plan view of a core 60 that may be used to manufacture the airfoil 40 shown in FIG. 2 by investment casting. As shown in FIG. 3, the core 60 may include a serpentine portion 62 with a number of long, thin branches or projections 64 that extend from the serpentine portion 62. The serpentine portion 62 generally corresponds to the size and location for the cavity 46 in the airfoil 40, and the projections 64 generally correspond to the size and location of the larger cooling passages 52 through the trailing edge 50 of the airfoil 40. The core 60 may be manufactured from any material having sufficient strength to withstand the high temperatures associated with the casting material (e.g., a high alloy metal) while maintaining tight positioning required for the core 60 during casting. For example, the core 60 may be cast from ceramic material, ceramic composite material, or other suitable materials. Once cast or otherwise manufactured, a laser, electron discharge machine, drill, water jet, or other suitable device may be used to refine or form the serpentine portion 62 and/or projections 64 shown in FIG. 3.

The core 60 may then be utilized in a lost wax process or other casting process as is known in the art. For example, the core 60 may be coated with a wax or other suitable material readily shaped to the desired thickness and curvature for the airfoil 40. The wax-covered core 60 may then be repeatedly dipped into a liquid ceramic solution to create a ceramic shell over the wax surface. The wax may then be heated to remove the wax from between the core 60 and the ceramic shell, creating a void between the core 60 and the ceramic shell that serves as a mold for the airfoil 40.

A molten high alloy metal may then be poured into the mold to form the airfoil 40. The high alloy metal may include, for example, nickel, cobalt, and/or iron super alloys such as GTD-111, GED-222, Rene 80, Rene 41, Rene 125, Rene 77, Rene N5, Rene N6, PWA 1484, PWA 1480, 4th generation single crystal super alloy, MX-4, Hastelloy X, cobalt-based HS-188, and similar alloys. After the high alloy metal cools and solidifies, the ceramic shell may be broken and removed, exposing the high alloy metal that has taken the shape of the void created by the removal of the wax. The core 60 may be removed from inside the airfoil 40 using methods known in the art. For example, the core 60 may be dissolved through a leaching process to remove the core 60, leaving the cavity 46 and cooling passages 52 in the airfoil 40.

Figure 4:
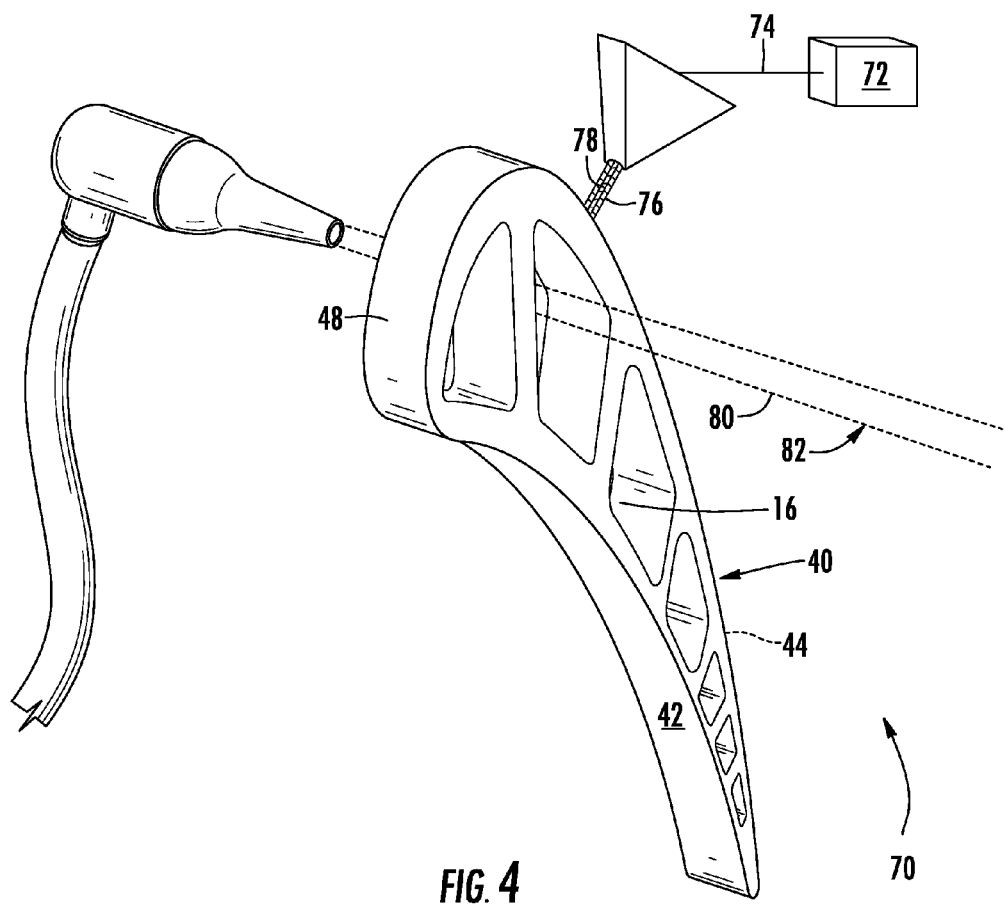
FIG. 4 is a perspective view of a system for manufacturing the airfoil shown in FIG. 2.

FIG. 4 provides a perspective view of a system 70 for creating additional cooling passages 52 through the airfoil 40. As shown in FIG. 4, the system 70 may include a laser 72 capable of generating an unfocused laser beam 74. The unfocused laser beam 72 may have a wavelength of approximately 532 nm, a pulse frequency of approximately 10 kHz, and an average power of approximately 40-50 W. In the particular embodiment shown in FIG. 4, the laser 72 directs the unfocused laser beam 74 inside or through a fluid column 76 toward the airfoil 40. The fluid column 76 may be any gas or liquid capable of focusing the unfocused laser beam 74 and may have a pressure in the range of approximately 700-1,500 pounds per square inch, although the present invention is not limited to any particular pressure for the fluid column 76 unless specifically recited in the claims. The fluid column 76 acts as a light guide for the unfocused laser beam 74 to create a focused or confined laser beam 78 directed at the airfoil 40. The confined laser beam 78 oblates the surface of the airfoil 40, eventually creating the desired cooling passage 52 through the airfoil 40.

Figure 5:
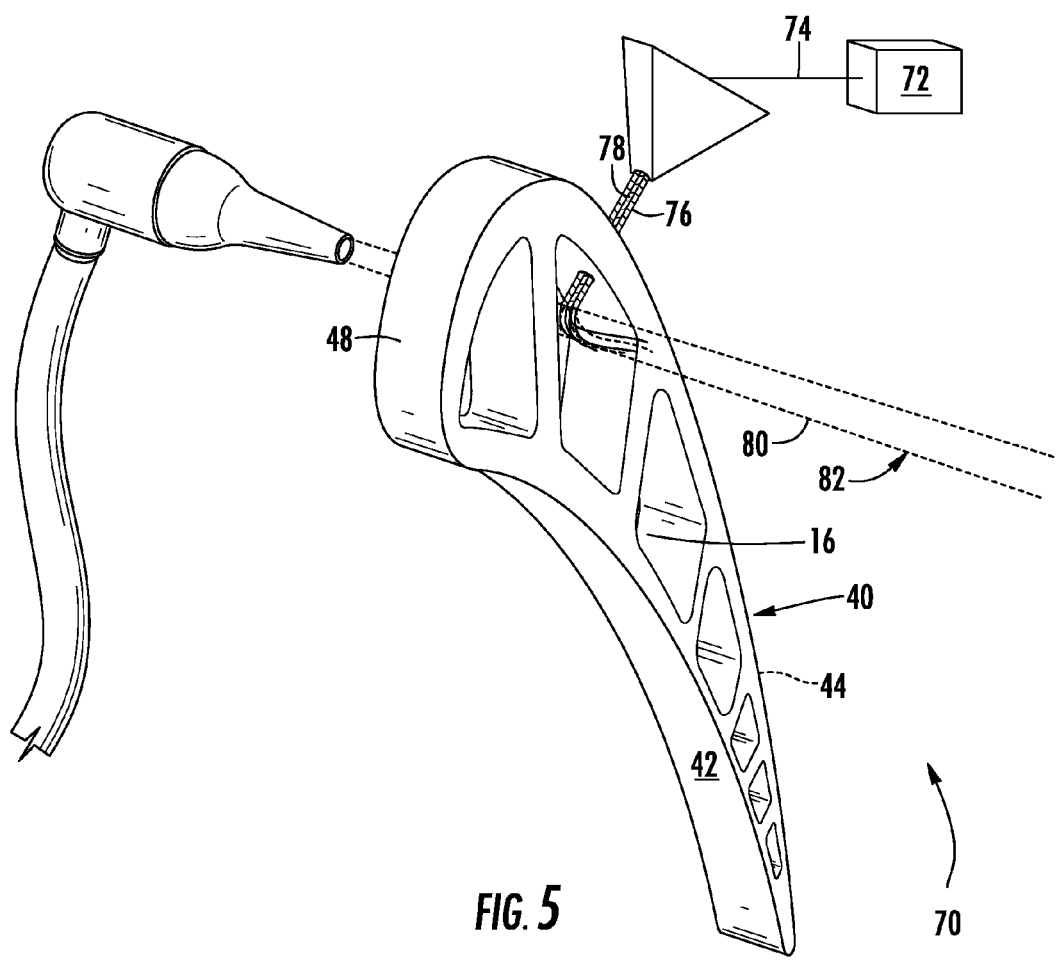
FIG. 5 is a perspective view of the system shown in FIG. 4 after the confined laser beam has penetrated through the airfoil.

FIG. 5 provides a perspective view of the system 70 shown in FIG. 4 after the confined laser beam 78 has penetrated through the airfoil 40. As shown in FIGS. 4 and 5, the system 70 further includes a gas 80 flowing inside the airfoil 40. As used herein, the term "gas" includes any gaseous media other than air. For example, the gas 80 may be an inert gas, a vacuum, a saturated steam, a superheated steam, or any other suitable gas other than air that may form a gaseous column 82 inside the airfoil 40. The gas 80 flowing inside the airfoil 40 may have a pressure roughly commensurate with the pressure of the gas or liquid in the fluid column 76 and sufficient to disrupt the fluid column 76 inside the airfoil 40. For example, the gas 80 flowing inside the airfoil 40 may have a pressure greater than approximately 25 pounds per square inch, although the present invention is not limited to any particular pressure for the gas 80 unless specifically recited in the claims.

As shown most clearly in FIG. 5, the gas 80 may be aligned to intersect with the fluid column 76 and/or confined laser beam 78 inside the airfoil 40. In particular embodiments, the gas 80 may be aligned substantially perpendicular to the fluid column 76, while in other particular embodiments, the gas 80 may be aligned at an oblique or acute angle with respect to the fluid column 76 and/or confined laser beam 78. As the gas 80 intersects with the fluid column 76 inside the airfoil 40, the gas 80 disrupts the fluid column 76 and/or scatters the confined laser beam 78 inside the airfoil 40. In this manner, the gas prevents the confined laser beam 78 from striking an inside surface of the airfoil 40 across from the newly formed cooling passage 52.

One of ordinary skill in the art will readily appreciate from the teachings herein that the system 70 described and illustrated with respect to FIGS. 4 and 5 may provide a method for manufacturing the airfoil 40. For example, the method may include directing the unfocused laser beam 74 at the surface of the airfoil 40 and confining the unfocused laser beam 74 with the fluid column 76 outside of the airfoil 40 to create the confined laser beam 78 outside of the airfoil 40, as shown in FIGS. 4 and 5. The method may further include creating the hole or cooling passage 52 through the surface of the airfoil 40 with the confined laser beam 78 and disrupting the fluid column 76 and/or confined laser beam 78 inside the airfoil 40 with the gas 80 inside the airfoil 40, as shown in FIG. 5. In this manner, the method may scatter the confined laser beam 78 inside the airfoil 40 to prevent the confined laser beam 78 from striking the inside surface of the airfoil 40 across from the cooling passage 52.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for manufacturing an airfoil, comprising:
   a. a fluid column;
   b. a laser beam inside said fluid column to create a confined laser beam directed at the airfoil; and
   c. a gas flowing inside the airfoil, wherein the gas disrupts said fluid column inside the airfoil.

2. The system as in claim 1, wherein said gas comprises steam.

3. The system as in claim 1, wherein said gas comprises an inert gas.

4. The system as in claim 1, wherein said gas has a pressure greater than 25 pounds per square inch.

5. The system as in claim 1, wherein said gas intersects with said fluid column inside the airfoil.

6. The system as in claim 1, wherein said gas comprises a gaseous column inside the airfoil.

7. A method for manufacturing an airfoil, comprising:
   a. confining a laser beam inside a fluid column to create a confined laser beam;
   b. directing said confined laser beam at a surface of the airfoil;
   c. creating a hole through the surface of the airfoil with said confined laser beam;
   d. flowing a gas inside the airfoil; and
   e. disrupting said fluid column with said gas flowing inside the airfoil.

8. The method as in claim 7, further comprising preventing said confined laser beam from striking an inside surface of the airfoil across from the hole.

9. The method as in claim 7, further comprising scattering said confined laser beam inside the airfoil.

10. The method as in claim 7, further comprising aligning said gas to intersect with said fluid column inside the airfoil.

11. The method as in claim 7, further comprising aligning said gas substantially perpendicular to said fluid column inside the airfoil.

12. The method as in claim 7, wherein flowing said gas inside the airfoil comprises flowing steam inside the airfoil.

13. The method as in claim 7, wherein flowing said gas inside the airfoil comprises flowing an inert gas inside the airfoil.

14. A method for manufacturing an airfoil, comprising:
   a. directing a laser beam at a surface of the airfoil;
   b. confining said laser beam inside a fluid column outside of the airfoil to create a confined laser beam outside of the airfoil;
   c. creating a hole through the surface of the airfoil with said confined laser beam; and
   d. disrupting said fluid column with a gas inside the airfoil.

15. The method as in claim 14, further comprising flowing said gas inside the airfoil.

16. The method as in claim 14, further comprising preventing said confined laser beam from striking an inside surface of the airfoil across from the hole.

17. The method as in claim 14, further comprising scattering said confined laser beam inside the airfoil.

18. The method as in claim 14, further comprising intersecting said fluid column with said gas inside the airfoil.

19. The method as in claim 14, wherein said gas inside the airfoil comprises steam inside the airfoil.

20. The method as in claim 14, wherein said gas inside the airfoil comprises an inert gas inside the airfoil.

* * * * *